United States Patent [19]

Collonia

[11] 4,353,339
[45] Oct. 12, 1982

[54] CONTROL OF THE TRAVELING SPEED OF A MOTOR VEHICLE

[75] Inventor: Harald Collonia, Glashütten, Fed. Rep. of Germany

[73] Assignee: VDO Adolf Schindling A.G., Frankfurt am Main, Fed. Rep. of Germany

[21] Appl. No.: 97,267

[22] Filed: Nov. 26, 1979

[30] Foreign Application Priority Data

Dec. 2, 1978 [DE] Fed. Rep. of Germany ....... 2852211

[51] Int. Cl.$^3$ ........................ F02D 11/16; F02D 11/02
[52] U.S. Cl. ........................................ 123/350; 123/399
[58] Field of Search ............... 123/352, 350, 340, 395, 123/353, 354, 357, 395, 396, 399

[56] References Cited

U.S. PATENT DOCUMENTS

| | | | |
|---|---|---|---|
| 3,648,798 | 3/1972 | Jania | 123/352 |
| 3,648,808 | 3/1972 | Kato | 123/350 |
| 3,757,750 | 9/1973 | Ohtani | 123/352 |
| 3,981,287 | 9/1976 | Williams | 123/352 |
| 4,112,885 | 9/1978 | Iwata | 123/350 |
| 4,117,903 | 10/1978 | Fleischer | 123/352 |
| 4,134,373 | 1/1979 | Kibler | 123/352 |

*Primary Examiner*—Ronald B. Cox
*Attorney, Agent, or Firm*—Martin A. Farber

[57] ABSTRACT

A device for the control of the traveling speed of a motor vehicle with a control member actuatable by the vehicle driver, particularly a gas pedal, which is coupled with a first position encoder or indicator, with an electric controller for the transmission of the adjustment movement of the control member to an element, which element influences the fuel-air mixture, particularly to a dosing member of a fuel injection pump, by means of an electric motor, the electric motor being in operative connection with the dosing member and acting against the force of a return spring, which electric motor is supplied with a motor current which current is formed in the controller, as well as with a second position encoder which second position encoder is coupled with the dosing member, the second position encoder being arranged in a feedback circuit with inclusion of the controller. The construction and sizing of the feedback circuit is such that the motor current variation which is formed by the feedback circuit is limited to or by an amount sufficient for the correction of the greatest possible position error of the regulating unit.

7 Claims, 1 Drawing Figure

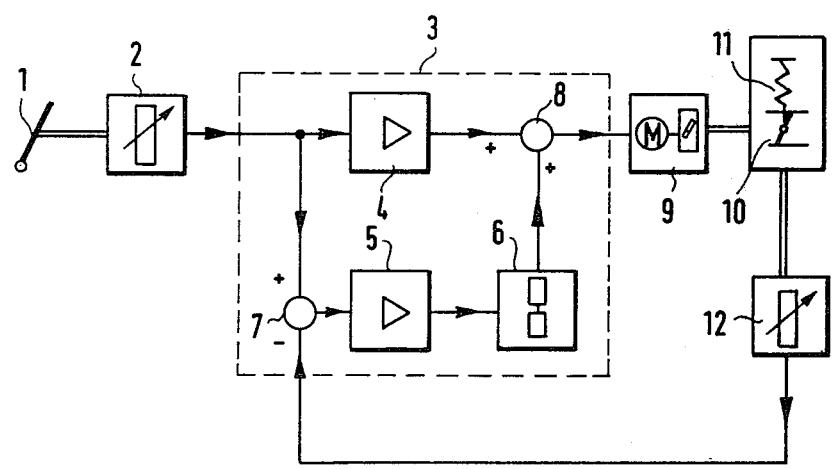

CONTROL OF THE TRAVELING SPEED OF A MOTOR VEHICLE

The invention relates to a device for the control of the traveling speed of a motor vehicle with a control member actuatable by the vehicle driver, particularly a gas pedal, which is coupled with a first position encoder or transmittor indicator, with an electric controller for the transmission of the adjustment movement of the control member to an element, which element influences the fuel-air mixture, particularly to a dosing member of a fuel injection pump, by means of an electric motor, the electric motor being in operative connection with the dosing member and acting against the force of a return spring, which electric motor is supplied with a motor current, which current is formed in the controller, as well as with a second position encoder, which second position encoder is coupled with the dosing member, the second position encoder being arranged in a feedback circuit with inclusion of the controller.

Known devices of this type are provided for the purpose of transmitting the adjustment or movement of a gas pedal, which gas pedal is accommodated in the vehicle compartment, to a throttle valve or to a dosing member of an injection pump in the motor chamber, without using for this purpose a Bowden cable or a mechanical gearing or transmission. Since by means of the gas pedal only a first position encoder, as a rule a rheostat or variable resistance, remains to be adjusted, slight displacement or controlling forces suffice, in contrast to the customary mechanical connection between the gas pedal and throttle valve.

One known device for the control of the traveling speed of a motor vehicle of the introductory named type has an electric controller, the desired value input of which is applied with the output signal of a first position encoder, which position encoder is coupled with the gas pedal, and the actual value input of which is applied with the output signal of a second electric position encoder, which second position encoder is mechanically coupled with an electromechanical regulating unit, the regulating unit being in operative connection with the element which influences the fuel-air mixture. By means of the second electric position encoder, which is arranged in the feedback circuit, the adjustment of the element which influences the fuel-air mixture, precisely follows the adjustment of the control member, particularly of the gas pedal, whereby position errors of the regulating unit based on frictional influences and similar disturbance variables are controlled, stabilized or leveled. This device of the control of the traveling speed of a motor vehicle in dependency on the position of the control member can, also, as is known, be expanded to such extent that the driving speed is regulated, according to a given or specified value. For this purpose the device in known fashion can be expanded in such a manner that a comparator whose one input is connected with the first position encoder and whose other input is applied with a voltage which is proportional to the motor speed is connected in front of the desired value input of the controller. With this device the motor is controlled to a constant motor speed which corresponds to the respectively prevailing gas pedal position. With a fixed or stationary gas pedal position a driving with a constant driving speed is brought about, independent of changes or variation in load. Here with this too for the exact adjustment or setting of the element influencing the fuel-air mixture, the feedback is provided by means of a second position encoder coupled with this element.

The feedback of the regulated variable with the second position encoder, which feedback, with an orderly or regular operation, provides a particularly exact adjustment of the regulating unit, however upon a disturbance can cause the breakdown or failure of the entire device, since the device attempts to adjust or set the feedback variable to a value that equals the control variable, which control variable is formed by the first position encoder. If therewith, because of a disturbance, the second position encoder, with the per se correct position of the regulating unit does not transmit the correct feedback value, the regulating unit is moved further and further from this correct position into a wrong position. In order to assure at least that upon a failure of the feedback that the throttle valve is not swung into a full-throttle position or unintendedly remains in the full-throttle position, means are provided in a known device with a regulating unit with a servomotor (which motor via an electrically actuatable coupling device is in operative connection with the element which influences the fuel-air mixture), which means upon a disturbance interrupt the force flow over the coupling device. Since the servomotor, or respectively the electric motor pivots the element influencing the fuel-air mixture from its rest position against the force of a spring, the element, by the decoupling of the servomotor, is swung back into its rest position by means of the spring. In this manner the motor vehicle engine can fall back into its idling rotational speed. With this device, however, it is not possible for the disturbed motor vehicle to further drive on under its own power, if even only for a shorter distance, for example, to the next service station.

It is an object of the present invention, therefore, while avoiding the disadvantages of the known devices, to form a device of the introductory-named type, such that even upon a disturbance of the feedback circuit, there is made possible at least an approximately exact adjustment or setting of the element which influences the fuel-air mixture in accordance with that control member which is actuable by the driver. This device at the same time should be as inexpensive as possible.

In accordance with the invention this object is aided in its realization by a structure and dimensioning or rating of the feedback circuit (5, 6, 7, 12) such that the motor current variation or change formed by means of the feedback circuit is limited to a magnitude sufficient for the correction (control, stabilization, or leveling) of the greatest possible position error of the regulating unit.

With undisturbed feedback circuit this device operates with high accuracy since possible deviations of position on the basis of frictional influences and similar disturbance variables are controlled or stabilized by the feedback variable in the usual manner. The feedback variable, however, has only a limited influence on the adjustment or variation of the regulating unit, which limited influence suffices for the elimination of position errors. With this it is not necessarily the aim to reach the exact position within the shortest time, but it is sufficient if the exact position is achieved within a still permissible adjusting or setting time. If, however, a disturbance occurs in the feedback circuit, which disturbance normally would result in a breakdown of the entire device, since the regulating unit would move to one of its stops or abutments, then in the present case, despite such disturbance, there is made possible an adjustment of the regulating unit in dependency on the position of the control member, or respectively, of the first position encoder, even though not exactly into a certain or defined position in dependency on the position of the control member, since here the position errors are not controlled or stabilized by the feedback circuit.

However, at least a limited further driving with the motor vehicle is entirely possible, to the contrary of the devices in which in case of disturbance the element which influences the fuel-air mixture is moved to an end or limit stop or abutment. The invention thus considerably increases the operating reliability of the device for the control of the vehicle speed.

A device with which the customarily largest possible position error is corrected (controlled, stabilized or leveled), is characterized by a dimensioning or rating of the feedback circuit (5, 6, 7, 12) such that the variation of the motor current which is caused by the second position encoder (12) amounts to 10 to 20% of the motor current which is controlled by the first position encoder (2).

With this development a position error of 10 to 20% occurs upon breakdown or failure of the feedback circuit, which position error with an intact feedback circuit is practically corrected (controlled, stabilized or leveled) to zero.

A less expensive and consequently suitable realization of the device is provided where the controller (3) comprises a first and a second amplifier (4, 5), with respectively an input of the first and of the second amplifier being connected with the first position encoder (2), the input of the second amplifier (5) additionally via a subtraction member (17) being connected with the second position encoder (12), with the outputs of both amplifiers (4, 5) via an addition arrangement (8) being in connection with the motor, and the transmission factor (amplification of the second amplifier (5)) is rated in the order of magnitude of one tenth of the first amplifier (4).

With this device thus the first amplifier lies in the control circuit, but also, so does the second amplifier, whereas the feedback circuit leads exclusively via the second amplifier. With the transmission factor, or respectively, the amplification of the second amplifier, the ratio between the output voltage of the amplifier (which output voltage is fed to the addition arrangement) to the input voltage of this second amplifier is here indicated or designated. This device also has the advantage that, upon failure of one of the two amplifiers, a limited continuation of driving is possible.

Finally this development is further distinguished in that no bridge output or final stage is required which can feed the electric motor, or respectively, the servomotor, with two current directions for the forward and backward operation.

A further simplification of the device resides in that both amplifiers (4, 5) have the same transmission factor and a voltage divider (6) is arranged between the output of the second amplifier (5) and the addition arrangement (8).

With this embodiment thus both amplifiers can be constructed in equal manner, and additionally to the second amplifier, merely a particularly simple voltage divider is required.

With the above and other objects and advantages in view, the present invention will become more clearly understood in connection with the detailed description of a preferred embodiment, when considered with the accompanying drawing, in which the only FIGURE is a block circuit diagram of a device for the control of the driving speed of a motor vehicle according to the invention.

Referring now to the drawing, a gas pedal 1, is coupled with a first position encoder or transmitter 2. The first position encoder 2 is connected to an electric controller 3, the controller 3 being indicated by a dashed line.

The controller 3 comprises essentially a first amplifier 4, a second amplifier 5 with a voltage divider 6 following connected in series thereto, a subtraction member 7 and an addition arrangement 8 connected to the outputs of the voltage divider 6 and the first amplifier 4.

The first amplifier 4 is applied with a voltage that has been released by the first position encoder 2, likewise the second amplifier 5 is applied with the voltage from the position encoder 2 via the subtraction member 7. The output of the amplifier 4 is fed to the addition arrangement 8, and the output of the amplifier 5 via the voltage divider 6 stands in connection with the addition arrangement 8.

A regulating unit 9 is connected to the output of the controller 3, which output of the regulator 3 at the same time is the output of the addition arrangement 8. The regulating unit 9 comprises an electric motor and a transmission or gearing with a switch lever or adjusting lever, which acts on a throttle valve 10 and a reset spring 11 of the throttle valve.

A second position encoder or transmitter 12 is coupled with the throttle valve 10, which second position encoder 12 sends a voltage to a subtraction input of the subtraction member 7 in the controller 3.

The feedback circuit of this device is thus formed by means of the second position encoder 12, the subtraction member 7 with the amplifier 5 and the voltage divider 6 via the addition arrangement 8 to the regulating unit 9. The voltage divider 6 is adjusted or set such that it passes or retransmits approximately 1/10 of the output voltage of the second amplifier 5 to the addition arrangement 8. The amplifiers 4 and 5 have the same amplification factor.

In the response or feedback circuit, a digital transmitter can also be provided in place of a potentiometer 12 as a second position encoder.

The device operates in the following manner:

By actuation of the gas pedal 1, the first position encoder or transmitter 2 is adjusted, with this the encoder 2 sending to the amplifiers 4 and 5 a voltage which is dependent on the position of the gas pedal 1. The output voltages of the two amplifiers 4 and 5 are added in the addition arrangement 8, in which connection in the voltage divider 6 there occurs a voltage division by the factor 10 between the output of the amplifier 5 and the addition arrangement 8. A current which is proportional to the sum of the voltages which are added in the addition arrangement 8 is fed to the electric motor M of the regulating unit 9. Via a transmission or mechanical gearing which also is part of the regulator unit 9, the electric motor M effects an adjustment movement of the throttle valve 10 against the force of the return spring 11. The adjustment occurs until the restoring torque which has been exerted on the throttle valve 10 by means of the return spring 11, in the opposite direction is equal to the torque which the electric motor exerts on the throttle valve 10 via the transmission or mechanical gearing of the regulator unit 9.

The position of the throttle valve 10 consequently stands in a defined or determined dependency on the current which is fed to the electric motor in the regulating unit 9, which current in turn depends upon the position of the gas pedal 1. A defined throttle valve position cannot be predetermined completely accurately by the position of the gas pedal, as a consequence of frictional influences and other disturbing effects. Therefore the throttle valve 10 is connected with a second position encoder 12, which second position encoder is also formed as a potentiometer. The voltage supplied by the potentiometer 12 is fed into the negation or negative input of the subtraction member 7. Thus the difference between the voltage transmitted by the first position encoder 2 and the voltage transmitted by the second position encoder 12 arrives at the input of the second amplifier 5. The output voltage of the second amplifier 5, as described, is fed via the voltage divider 6 into the addition arrangement 8.

The feedback circuit, which is formed with the second position encoder 12, the subtraction member 7, the second amplifier 5 and the voltage divider 6, causes the deviations of position of the throttle valve 10 to be automatically corrected, i.e., controlled, leveled out or stabilized from a desired or nominal position, which nominal position is predetermined by the position of the gas pedal 1. The current which for this purpose is produced with the amplifier 5 and with the voltage divider 6, however, suffices only for a comparatively slight adjustment movement of the throttle valve. With this even upon a disturbance of the feedback circuit, a control of the throttle valve position is obtained by means of the gas pedal, whereby the throttle valve is not moved automatically into one of its end positions, but is moved approximately into the desired position. In this way, there only occurs the deviation of position which is caused by friction and other disturbance or interference influences.

The above described device is particularly suited for the control of the adjustment of a dosing or proportioning element of a fuel injection pump, since with the latter the frictional forces are comparatively small.

While there has been disclosed embodiments of this invention, it is to be understood that these embodiments are given by example only and not in a limiting sense.

I claim:

1. In a device for the control of the traveling speed of a motor vehicle with a control member actuatable by the vehicle driver, particularly a gas pedal, which is coupled with a first position encoder, an electric controller for the transmission of the adjustment movement of the control member to an element, which element influences a fuel-air mixture, by means of a regulating unit including an electric motor, the electric motor being in operative connection with the element and acting against the force of a return spring, which electric motor is supplied with a motor current which current is formed in the controller, a second position encoder, which second position encoder is coupled with the element, the second position encoder being arranged in a feedback circuit with inclusion of the controller, the improvement wherein the feedback circuit constitutes means for varying the motor current and has a construction and sizing such that the motor current variation formed by the feedback circuit is limited to a value sufficient for correcting the greatest possible position error of the regulating unit, the sizing of the feedback circuit is such that the motor current variation which is caused by the second position encoder amounts to about 10 to 20% of the motor current controlled by the first position encoder.

2. In a device for the control of the traveling speed of a motor vehicle with a control member actuatable by the vehicle driver, particularly a gas pedal, which is coupled with a first position encoder, an electric controller for the transmission of the adjustment movement of the control member to an element, which element influences a fuel-air mixture, by means of a regulating unit including an electric motor, the electric motor being in operative connection with the element and acting against the force of a return spring, which electric motor is supplied with a motor current which current is formed in the controller, a second position encoder, which second position encoder is coupled with the element, the second position encoder being arranged in a feedback circuit with inclusion of the controller, the improvement wherein the feedback circuit constitutes means for varying the motor current such that the motor current variation formed by the feedback circuit is limited to a value sufficient for correcting the greatest possible position error of the regulating unit, the controller comprises, a first amplifier and a second amplifier, respectively an input of the first amplifier and an input of the second amplifier is operatively connected with the first position encoder, a subtraction member has an output connected to said input of said second amplifier and has an input connected to said second position encoder, an addition arrangement is connected to outputs of both said amplifiers, said addition arrangement is connected with the motor, and the transmission factor (amplification of said second amplifier) is in the order of magnitude of one tenth of said first amplifier.

3. The device as set forth in claim 1, wherein the controller comprises, a first amplifier and a second amplifier, respectively an input of the first amplifier and an input of the second amplifier is operatively connected with the first position encoder, a subtraction member has an output connected to said input of said second amplifier and has an input connected to said second position encoder, an addition arrangement is connected to outputs of both said amplifiers, said addition arrangement is connected with the motor, and the transmission factor (amplification of said second amplifier) is in the order of magnitude of one tenth of said first amplifier.

4. The device as set forth in claim 2 or 3, wherein both of said amplifiers have the same transmission factor, and a voltage divider is arranged between the output of said second amplifier and said addition arrangement.

5. The device as set forth in claim 2 or 3, wherein said subtraction member has another input connected to said first position encoder.

6. The device according to claim 1 or 2, wherein said element is a throttle valve unit.

7. The device according to claim 1 or 2, wherein said element is a dosing member of a fuel injection pump.

* * * * *